(12) United States Patent
Horie et al.

(10) Patent No.: US 11,687,449 B2
(45) Date of Patent: Jun. 27, 2023

(54) CONCURRENT MARKING GARBAGE COLLECTION

(71) Applicant: INTERNATIONAL BUSINESS MACHINES CORPORATION, Armonk, NY (US)

(72) Inventors: Michihiro Horie, Ageo (JP); Kazunori Ogata, Soka (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 288 days.

(21) Appl. No.: 17/017,215

(22) Filed: Sep. 10, 2020

(65) Prior Publication Data

US 2022/0075721 A1    Mar. 10, 2022

(51) Int. Cl.
G06F 12/02 (2006.01)
G06F 16/23 (2019.01)
G06F 16/22 (2019.01)

(52) U.S. Cl.
CPC ...... *G06F 12/0253* (2013.01); *G06F 16/2237* (2019.01); *G06F 16/2308* (2019.01); *G06F 2212/1044* (2013.01)

(58) Field of Classification Search
None
See application file for complete search history.

(56) References Cited

U.S. PATENT DOCUMENTS

| | | | |
|---|---|---|---|
| 7,340,494 B1* | 3/2008 | Detlefs | G06F 12/0269 711/170 |
| 7,412,466 B1* | 8/2008 | Garthwaite | G06F 12/0253 |
| 7,937,419 B2 | 5/2011 | Ylonen | |
| 9,946,657 B1* | 4/2018 | Muthukkaruppan | G06F 12/0868 |
| 10,261,898 B1* | 4/2019 | Payer | G06F 12/0269 |
| 11,119,942 B2* | 9/2021 | Gschwind | G06F 3/0685 |
| 11,132,290 B2* | 9/2021 | Gschwind | G06F 12/023 |
| 2005/0114413 A1* | 5/2005 | Subramoney | G06F 12/0269 |

(Continued)

FOREIGN PATENT DOCUMENTS

CN          111159058 A  *  5/2020  ......... G06F 12/0246

OTHER PUBLICATIONS

Vatsal Unadkat, "Advantages and Disadvantages of Search Algorithms", Nov. 21, 2019, pp. 1-6, https://medium.com/@vatsalunadkat/advantages-and-disadvantages-of-ai-algorithms-d8fb137f4df2 (Year: 2019).*

(Continued)

*Primary Examiner* — Christopher D Birkhimer
(74) *Attorney, Agent, or Firm* — Tutunjian & Bitetto, P.C.; Randy Emilio Tejeda

(57) ABSTRACT

A computer-implemented method is provided for reducing Compare And Swap (CAS) operations in a concurrent marking Garbage Collection (GC) process that operates on objects corresponding to a bit map of multiple blocks. The method includes finding, from among the objects, live objects that belong to a same block in the bit map from among the multiple blocks when traversing object trees of the objects for GC marking. The method further includes loading a latest value of the same block from the bitmap, updating the latest value by setting corresponding marking bits in the bit map, and updating the same block in the bit map with a single CAS operation.

20 Claims, 11 Drawing Sheets

(56) References Cited

U.S. PATENT DOCUMENTS

| | | | | |
|---|---|---|---|---|
| 2005/0198088 | A1* | 9/2005 | Subramoney | G06F 16/2308 |
| 2009/0248766 | A1 | 10/2009 | Garthwaite et al. | |
| 2016/0117117 | A1* | 4/2016 | Heller, Jr. | G06F 3/0604 |
| | | | | 711/166 |
| 2017/0116116 | A1* | 4/2017 | Mittal | G06F 9/466 |
| 2018/0034824 | A1* | 2/2018 | Maycotte | H04L 63/102 |
| 2018/0336127 | A1* | 11/2018 | Hutchison | G06F 12/0246 |
| 2019/0138441 | A1* | 5/2019 | Gschwind | G06F 12/1027 |
| 2019/0227925 | A1* | 7/2019 | Hsu | G06F 3/0652 |
| 2020/0026781 | A1* | 1/2020 | Khot | G06F 16/164 |
| 2020/0073797 | A1* | 3/2020 | Vaardal | G06F 12/0826 |

OTHER PUBLICATIONS

Anonymous, "Breadth First Search (BFS): Concept, Implementation, Advantages, Disadvantages", Oct. 1, 2019, pp. 1-5, https://web.archive.org/web/20191001122253/https://www.brainkart.com/article/Breadth-Fi rst-Search-(BFS)--Concept,-Implementation,-Advantages,-Disadvantages_8876/ (Year: 2019).*

Anonymous, "Depth First Search (DFS): Concept, Implementation, Advantages, Disadvantages", Oct. 2, 2019, pp. 1-6, https://web.archive.org/web/20191002194604/https://www.brainkart.com/article/Depth-First-Search-(DFS)--Concept,-Implementation,-Advantages,-Disadvantages_8877/ (Year: 2019).*

Anonymous, "Depth first search (DFS) vs Breadth first search (BFS)", Apr. 15, 2020, pp. 1-7, https://web.archive.org/web/20200415202323/https://www.techiedelight.com/depth-first-search-dfs-vs-breadth-first-search-bfs/(Year: 2020).*

The Crazy Programmer, "Advantages and Disadvantages of Linked Lists", Nov. 28, 2016, pp. 1-4, https://web.archive.org/web/20161128103204/https://www.thecrazyprogrammer.com/2016/11/advantages-disadvantages-linked-list.html (Year: 2016).*

Degenbaev et al., "Concurrent Marking of Shape-Changing Objects", Proceedings of the 2019 ACM SIGPLAN International Symposium on Memory Management (ISMM '19), Jun. 2019, p. 89-102.

Flood et al., "Shenandoah—An Open-Source Concurrent Compacting Garbage Collector for OpenJDK", PPPJ '16, Aug. 2016, 9 pages.

Iyengar et al., "Scalable Concurrent and Parallel Mark", ISMM'12, Jun. 2012, pp. 61-71.

Mell et al. "The NIST Definition of Cloud Computing", NIST Special Publication 800-145, 2011, 7 pages.

Sjoberg, Andreas, "Evaluating and Improving Remembered Sets in the HotSpot G1 Garbage Collector", KTH Computer Science and Communication, 2013, 68 pages.

* cited by examiner

US 11,687,449 B2

CONCURRENT MARKING GARBAGE COLLECTION

BACKGROUND

The present invention relates generally to garbage collection and, in particular, to setting multiple bits simultaneously in a bitmap for concurrent marking Garbage Collection (GC).

Open Java Development Kit (OJDK) Garbage First (G1) Garbage Collection (GC) is a concurrent GC process for tenure space. G1 splits the heap into young and old generations. Space-reclamation efforts concentrate on the young generation where it is most efficient to do so, with occasional space-reclamation in the old generation. G1 garbage collection pauses can reclaim space in the young generation as a whole, and any additional set of old generation regions at any collection pause. During the pause, G1 copies objects from this collection set to one or more different regions in the heap. The destination region for an object depends on the source region of that object: the entire young generation is copied into either survivor or old regions, and objects from old regions to other, different old regions using aging.

In OpenJDK, a bit map is used to record information regarding live objects. A bit map corresponding to the objects can be a ¹⁄₆₄ scale of heap memory that includes multiple blocks of 8 bytes each, so a block has 64 bit entries. Setting a bit in a block of the bit map means updating the value of the block. Since multiple threads can update the value of a same block simultaneously, threads try to update the value atomically by using a Compare-And-Swap (CAS) operation. Thus, an expensive CAS operation is necessary to update a single bit in the bit map.

SUMMARY

According to aspects of the present invention, a computer-implemented method is provided for reducing Compare And Swap (CAS) operations in a concurrent marking Garbage Collection (GC) process that operates on objects corresponding to a bit map of multiple blocks. The method includes finding, from among the objects, live objects that belong to a same block in the bit map from among the multiple blocks when traversing object trees of the objects for GC marking. The method further includes loading a latest value of the same block from the bitmap, updating the latest value by setting corresponding marking bits in the bit map, and updating the same block in the bit map with a single CAS operation.

According to other aspects of the present invention, a computer program product is provided for reducing Compare And Swap (CAS) operations in a concurrent marking Garbage Collection (GC) process that operates on objects corresponding to a bit map of multiple blocks. The computer program product includes a non-transitory computer readable storage medium having program instructions embodied therewith. The program instructions are executable by a computer to cause the computer to perform a method. The method includes finding, from among the objects, live objects that belong to a same block in the bit map from among the multiple blocks when traversing object trees of the objects for GC marking. The method further includes loading a latest value of the same block from the bitmap, updating the latest value by setting corresponding marking bits in the bit map, and updating the same block in the bit map with a single CAS operation.

According to yet other aspects of the present invention, a computer processing system is provided for reducing Compare And Swap (CAS) operations in a concurrent marking Garbage Collection (GC) process that operates on objects corresponding to a bit map of multiple blocks. The computer processing system includes a memory device for storing program code. The computer processing system further includes a hardware processor, operatively coupled to the memory device, for running the program code to find, from among the objects, live objects that belong to a same block in the bit map from among the multiple blocks when traversing object trees of the objects for GC marking. The hardware processor further runs the program code to load a latest value of the same block from the bitmap, update the latest value by setting corresponding marking bits in the bit map, and update the same block in the bit map with a single CAS operation.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to setting multiple bits simultaneously in a bitmap for concurrent marking Garbage Collection (GC).

Conventional methods for G1 GC require an expensive CAS operation to update a single bit.

In contrast, embodiments of the present invention set (update) multiple bits simultaneously with a CAS operation by finding out objects whose corresponding bits are in the same block in a bit map.

Figure 1:
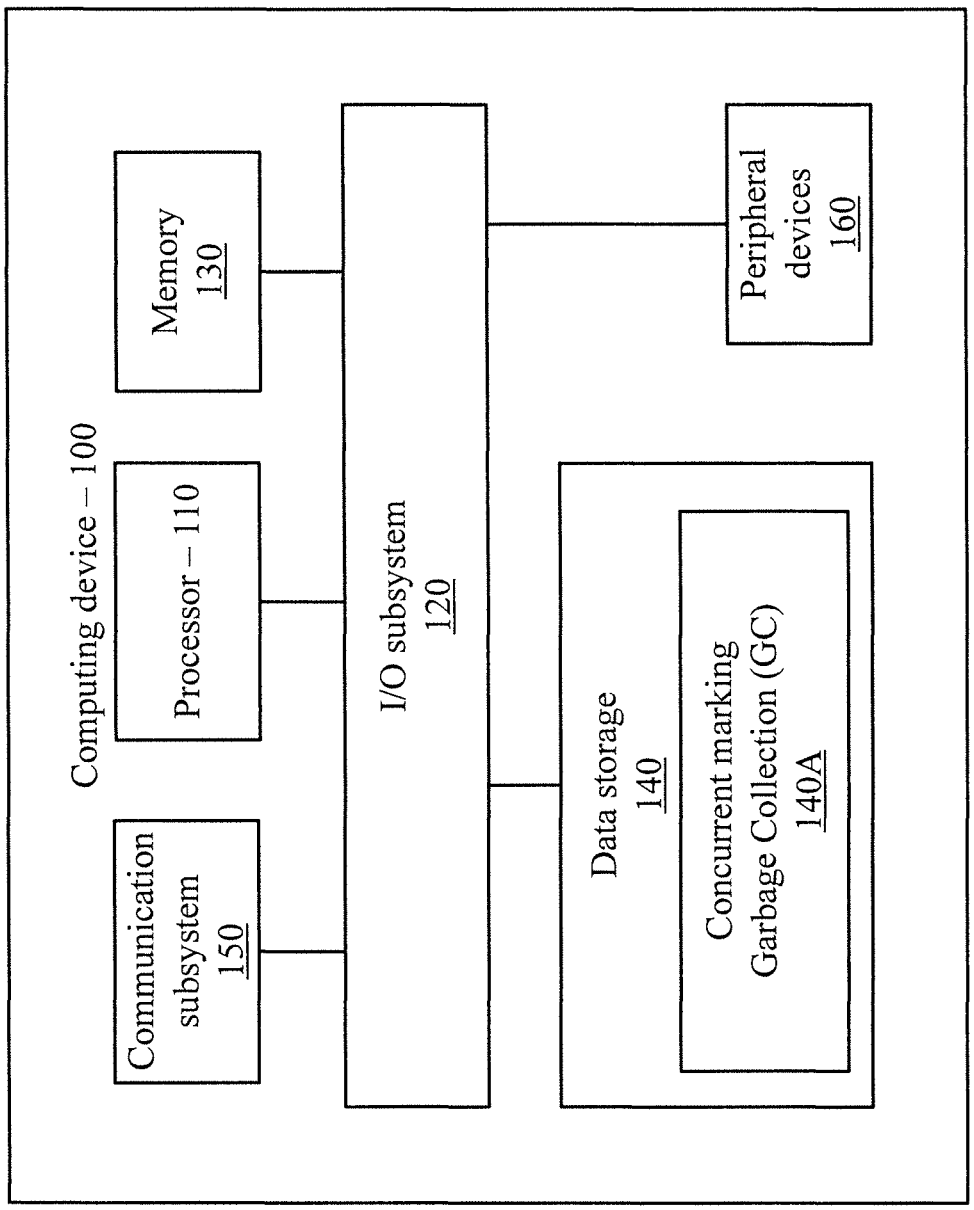
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to set multiple bits simultaneously in a bitmap for concurrent marking Garbage Collection (GC).

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for concurrent marking Garbage Collection (GC). The concurrent GC can set multiple bits simultaneously for concurrent marking GC. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 10-11). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
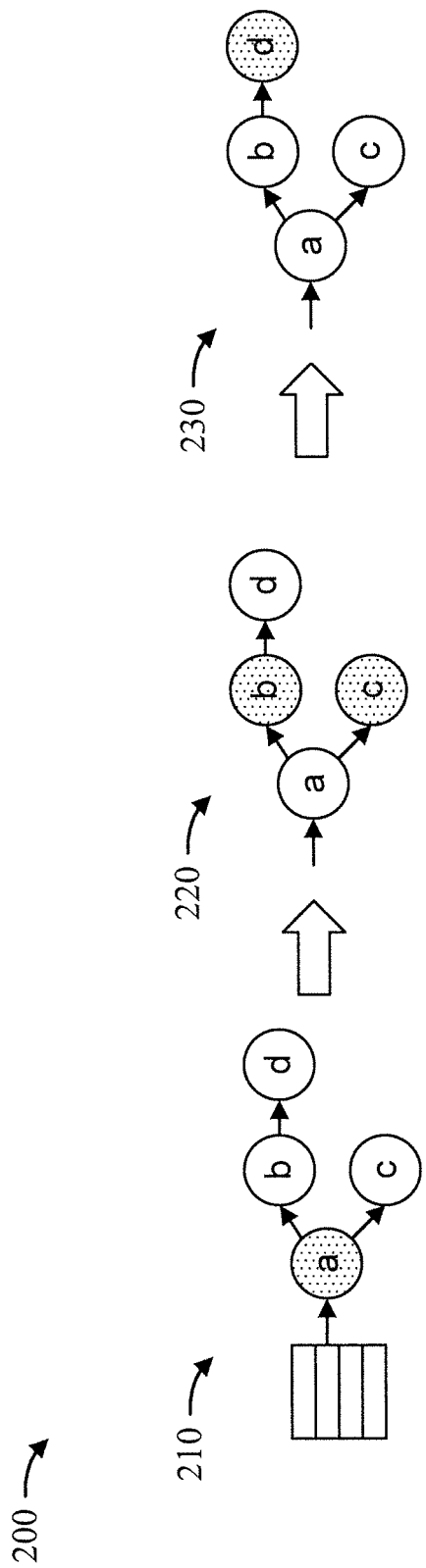
FIG. 2 is a block diagram showing an exemplary marking process to which the present invention can be applied, in accordance with an embodiment of the present invention.

These and other variations of a hardware processor subsystem are also contemplated in accordance with embodiments of the present invention FIG. 2 is a block diagram showing an exemplary marking process 200 to which the present invention can be applied, in accordance with an embodiment of the present invention.

The marking process 200 is applied to a root set 201 and objects a, b, c, and d.

In a first block 210 of the marking process 200, a GC thread initially marks (as indicated using a dot hatch scheme) object a that is directly references from the root set 201. In a second block 220 of the marking process, the GC thread then reaches objects b and c by scanning object a, and marks objects b and c. In a third block 230 of the marking process, the GC thread finally marks object d that is referenced by object b.

Marking an object is performed by setting a bit corresponding to the object in a bit map. Objects in heap memory are allocated with 8 bytes alignment.

A bit map is a ⅟64 scale of heap memory in the form of a Boolean array. The bit map includes multiple blocks whose size is 8 bytes each, so a block has 64-bit entries. Dividing a bit map into 8-byte blocks comes from the restriction that 8 bytes is a common size of the atomic word for CAS instructions among supporting platforms such as x86 and POWER. Setting a bit in a block means updating the value of the block. The initial values in the bit map are 0, and when an object is marked, the corresponding index in the bit map is set to 1.

Figure 3:
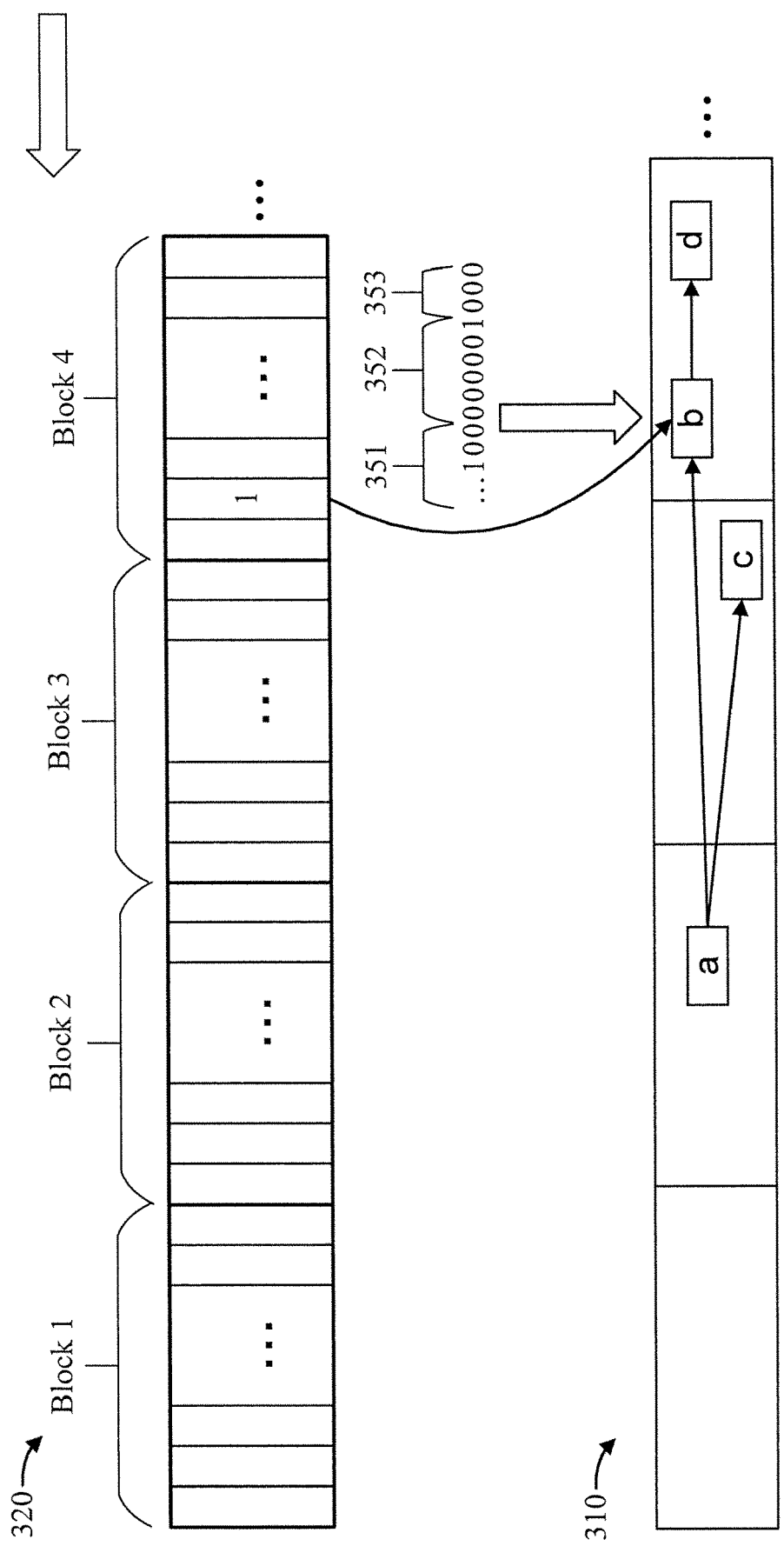
FIG. 3 is a block diagram showing an exemplary heap portion and an exemplary bit map portion to which the present invention can be applied, in accordance with an embodiment of the present invention.

FIG. 3 is a block diagram showing an exemplary heap portion 310 and an exemplary bit map portion 320 to which the present invention can be applied, in accordance with an embodiment of the present invention.

The heap portion 310 and bit map portion 320 correspond to the exemplary marking process 200 of FIG. 2. The heap portion 310 includes 4 regions, namely 310A, 310B, 310C, and 310D. The bit map portion includes 4 blocks, namely block 1, block 2, block 3, and block 4.

The upper 55 bits 351 determines which block a bit is in, while a lower 6 bits 352 determines an index of a block and the lowest 3 bits 353 are zeros due to 8-byte alignment.

The 1 bit in block 4 of bit map portion 320 corresponds to object b in the heap portion 310.

In contrast to the prior art approach of multiple threads atomically updating a single bit value of a same block simultaneously using a CAS operation, embodiments of the present invention set multiple bits simultaneously with a CAS operation by finding objects whose corresponding bits are in the same (heap) block.

Figure 4:
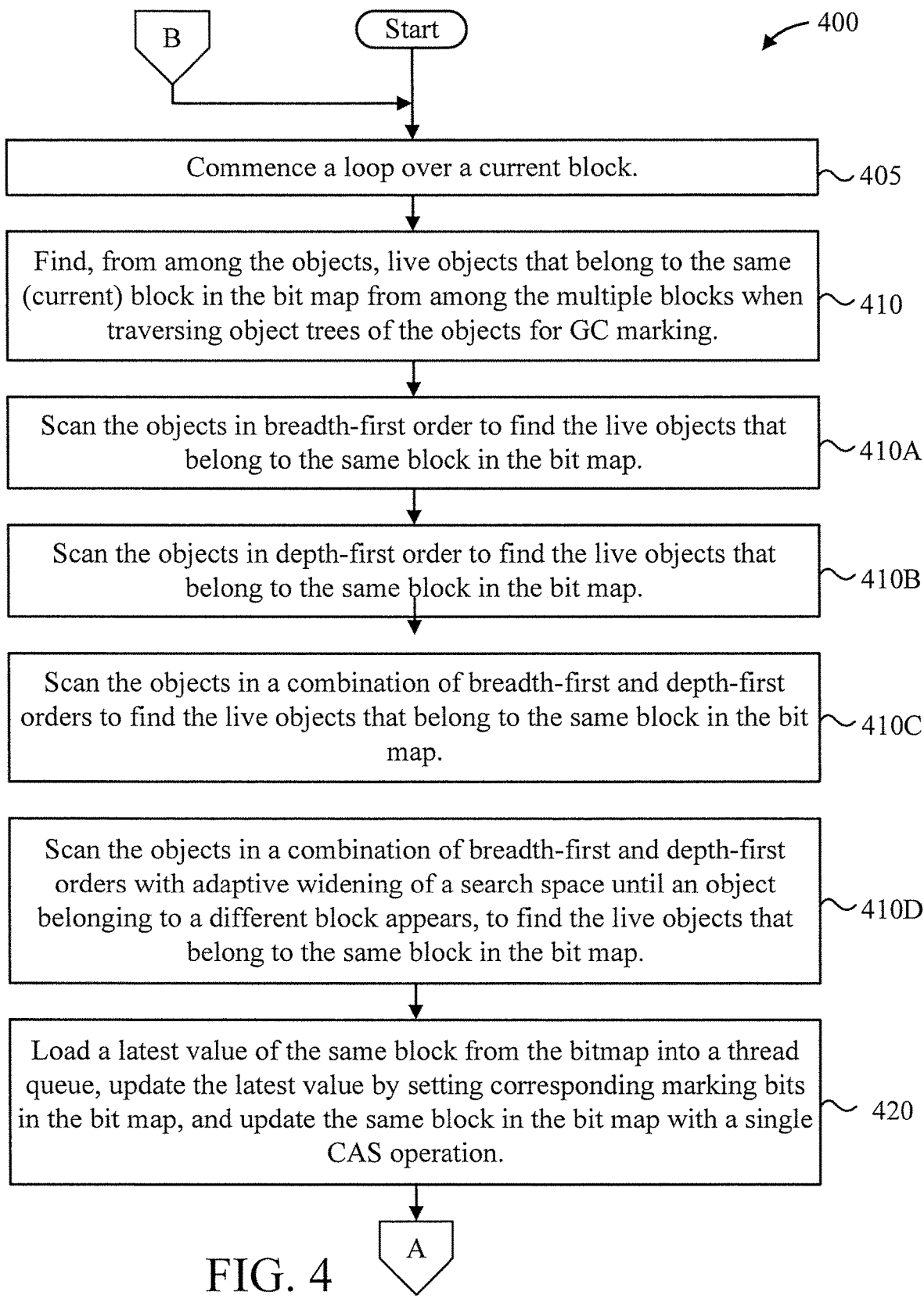
FIGS. 4-5 are flow diagrams showing an exemplary method for setting multiple bits simultaneously in a bitmap formed of multiple blocks for concurrent marking Garbage Collection (GC), in accordance with an embodiment of the present invention.
Figure 5:
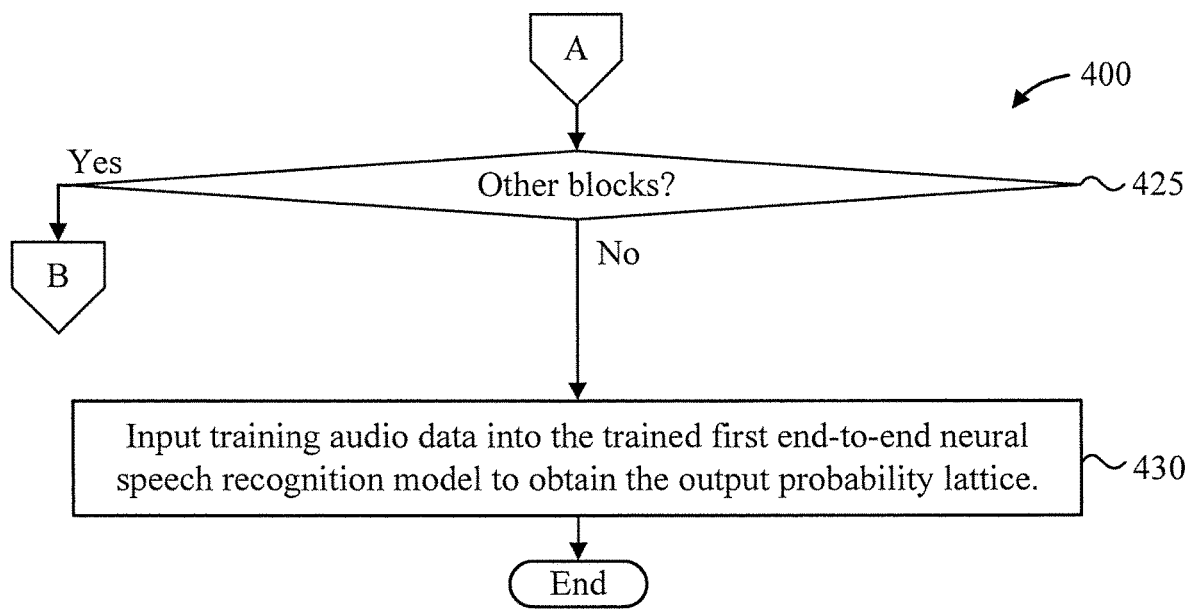

FIGS. 4-5 are flow diagrams showing an exemplary method 400 for setting multiple bits simultaneously in a bitmap formed of multiple blocks for concurrent marking Garbage Collection (GC), in accordance with an embodiment of the present invention.

At block 405, commence a loop over a current block.

At block 410, find, from among the objects, live objects that belong to the same (current) block in the bit map from among the multiple blocks when traversing object trees of the objects for GC marking. An object is considered "live" if the object has a current reference pointing to it.

In an embodiment, block 410 can include one or more of blocks 410, 410B, 410C, and 410D.

At block 410A, scan the objects in breadth-first order to find the live objects that belong to the same block in the bit map. In this way, all sibling nodes of a current node will be examined before proceeding to a child node of the current node and the siblings of the child node.

At block 410B, scan the objects in depth-first order to find the live objects that belong to the same block in the bit map. In this way, all child, grandchild, and so forth nodes of a current node will be examined before proceeding to a sibling node of the current node.

At block 410C, scan the objects in a combination of breadth-first and depth-first orders to find the live objects that belong to the same block in the bit map.

At block 410D, scan the objects in a combination of breadth-first and depth-first orders with adaptive widening of a search space until an object belonging to a different block appears, to find the live objects that belong to the same block in the bit map.

At block 420, load a latest value of the same block from the bitmap into a thread queue, update the latest value by setting corresponding marking bits in the bit map, and update the same block in the bit map with a single CAS operation. Setting corresponding marking bits in the bit map means setting respective marking bits of the live objects in the same block in the heap. The target block is updated by comparing the set values to the previous values and, upon a mismatch being detected, swapping out the previous values for the set values.

At block 425, determine whether any other blocks remain. If so, then return to block 405. Otherwise, terminate the method.

At block 430, perform a garbage collection. The garbage collection can persist the marked objects and can collect and remove the unmarked objects.

Figure 6:
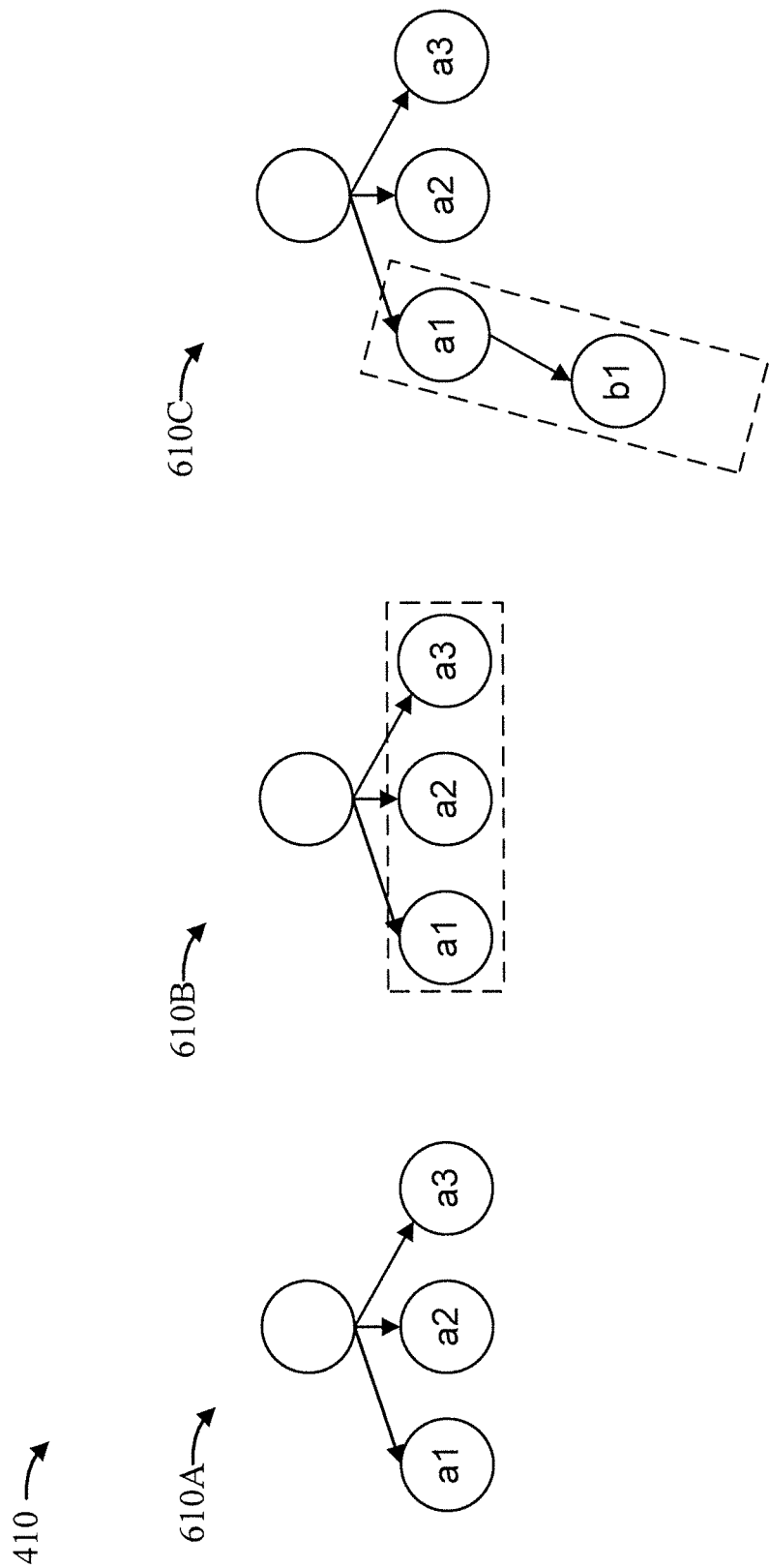
FIG. 6 is a block diagram graphically showing a block of FIG. 4, in accordance with an embodiment of the present invention.

FIG. 6 is a block diagram graphically showing block 410 of FIG. 4, in accordance with an embodiment of the present invention.

In a first portion 610A of block 410, child objects are obtained. In the example, the child objects includes objects a1, a2, and a3.

In a second portion 610B of block 410, among other child objects, objects are found that belong to the same block. In block 610B, the objects are found using a breadth-first order. Of course, other orders including hybrid (mixed) orders can be used, some of which are described herein.

In a third portion 610C of block 410, among a child and its children (i.e., grandchildren), objects are found that belong to the same block. In block 610C, the objects are found using a depth-first order. Of course, other orders including hybrid (mixed) orders can be used, some of which are described herein. In the example, a single grandchild b1 is shown for the sake of illustration.

Figure 7:
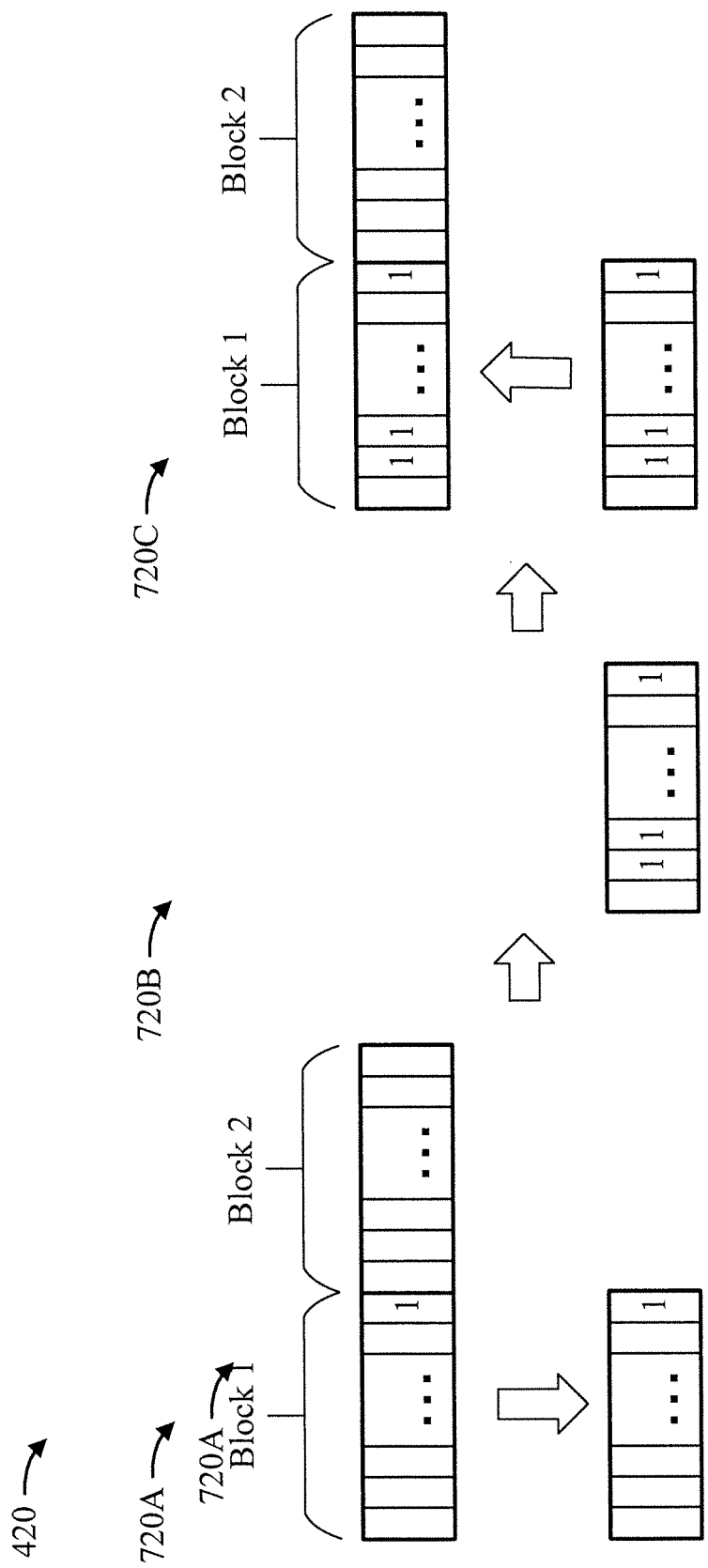
FIG. 7 is a block diagram graphically showing another block of FIG. 4, in accordance with an embodiment of the present invention.

FIG. 7 is a block diagram graphically showing block 420 of FIG. 4, in accordance with an embodiment of the present invention.

In a first portion 720A of block 420, the latest value of a target block is loaded from the bit map.

In a second portion 720B of block 420, the marking bits of the objects of the target (i.e., the same) block are set.

In a third portion 720C of block 420, update the value of the target block in the bit map with a CAS operation.

Figure 8:
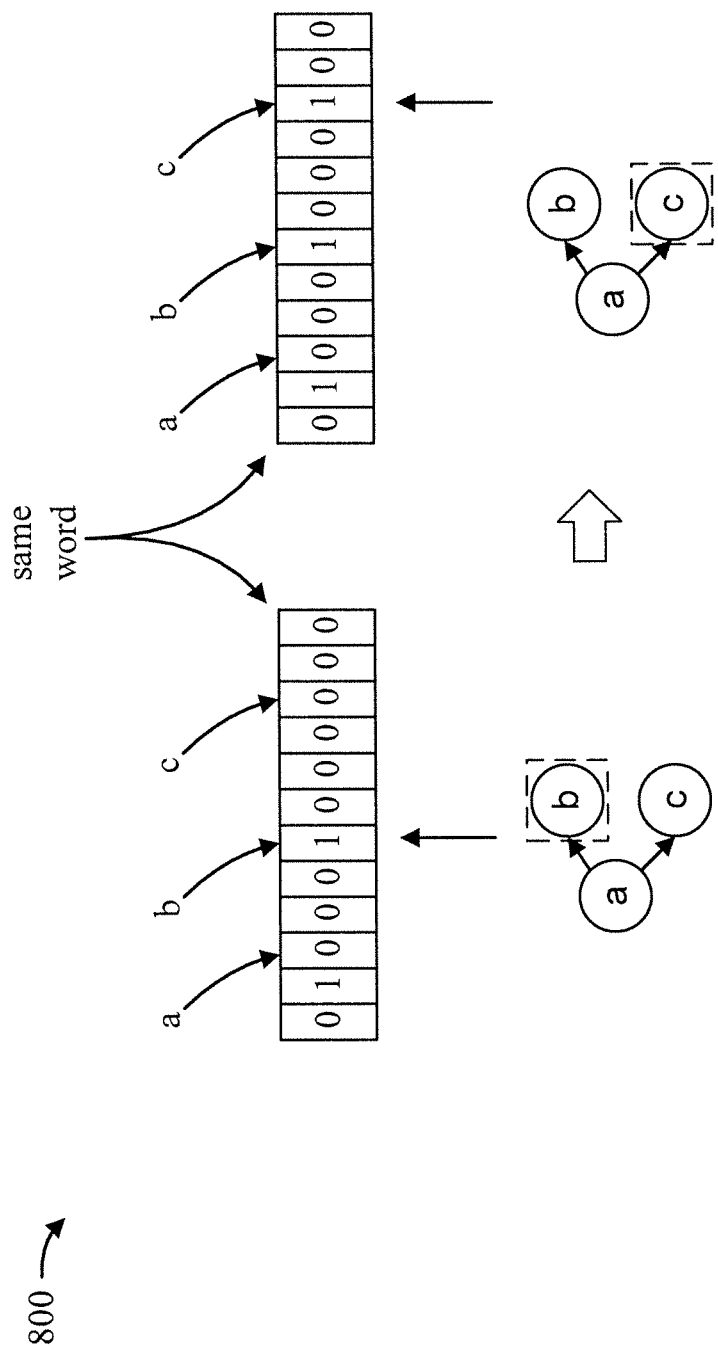
FIG. 8 is a block diagram showing an exemplary scenario to which the present invention can be applied, in accordance with an embodiment of the present invention.

FIG. 8 is a block diagram showing an exemplary scenario 800 to which the present invention can be applied, in accordance with an embodiment of the present invention.

A thread can check whether a parent and its child are in the same word in the bitmap and update multiple bits simultaneously when they are in the same word. Since objects in an object tree are usually allocated in the neighborhood in the heap memory, the bits for most of these objects can be expected to be in the same word in the bit map. For example, in scenario 800, setting two bits for objects and b is performed with a single CAS at a time when the parent and the child are in a same word/entry in the bit map.

Figure 9:
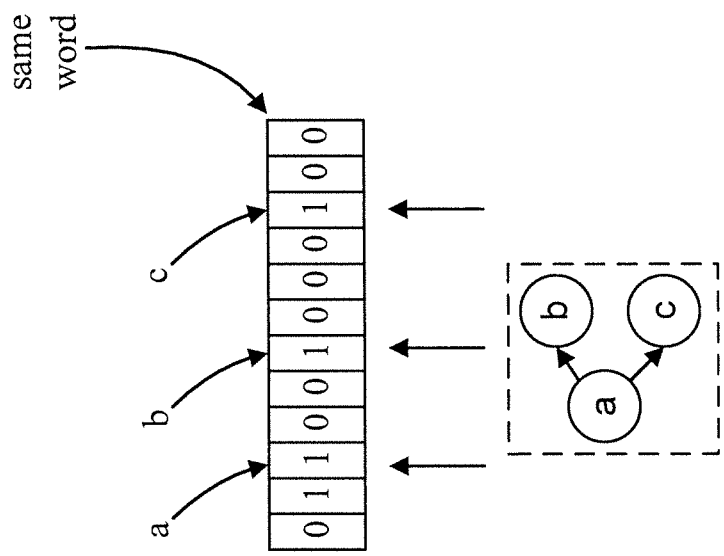
FIG. 9 is a block diagram showing another exemplary scenario to which the present invention can be applied, in accordance with an embodiment of the present invention.

FIG. 9 is a block diagram showing another exemplary scenario 900 to which the present invention can be applied, in accordance with an embodiment of the present invention.

In scenario 900, multiple bits can be set when sibling objects are in the same word in the bit map.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
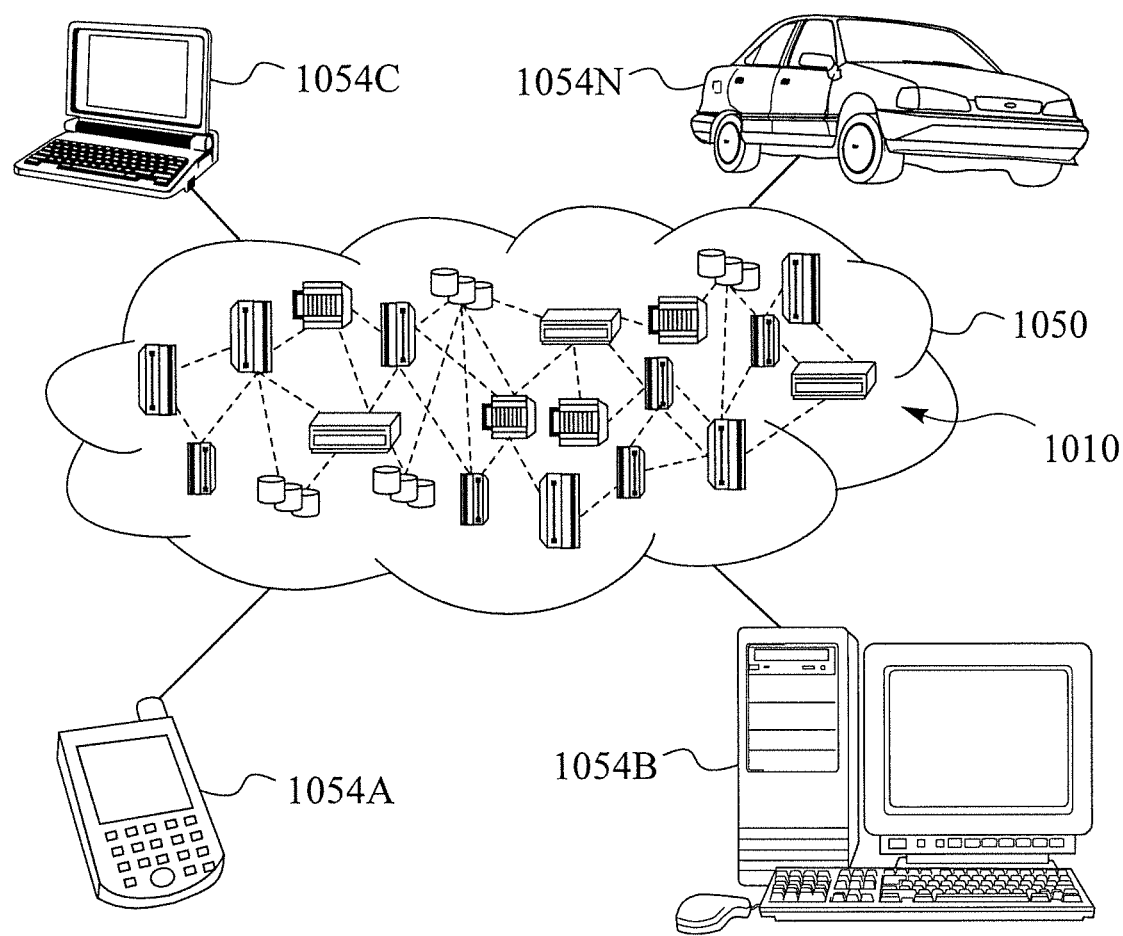
FIG. 10 is a block diagram showing an illustrative cloud computing environment having one or more cloud computing nodes with which local computing devices used by cloud consumers communicate, in accordance with an embodiment of the present invention.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
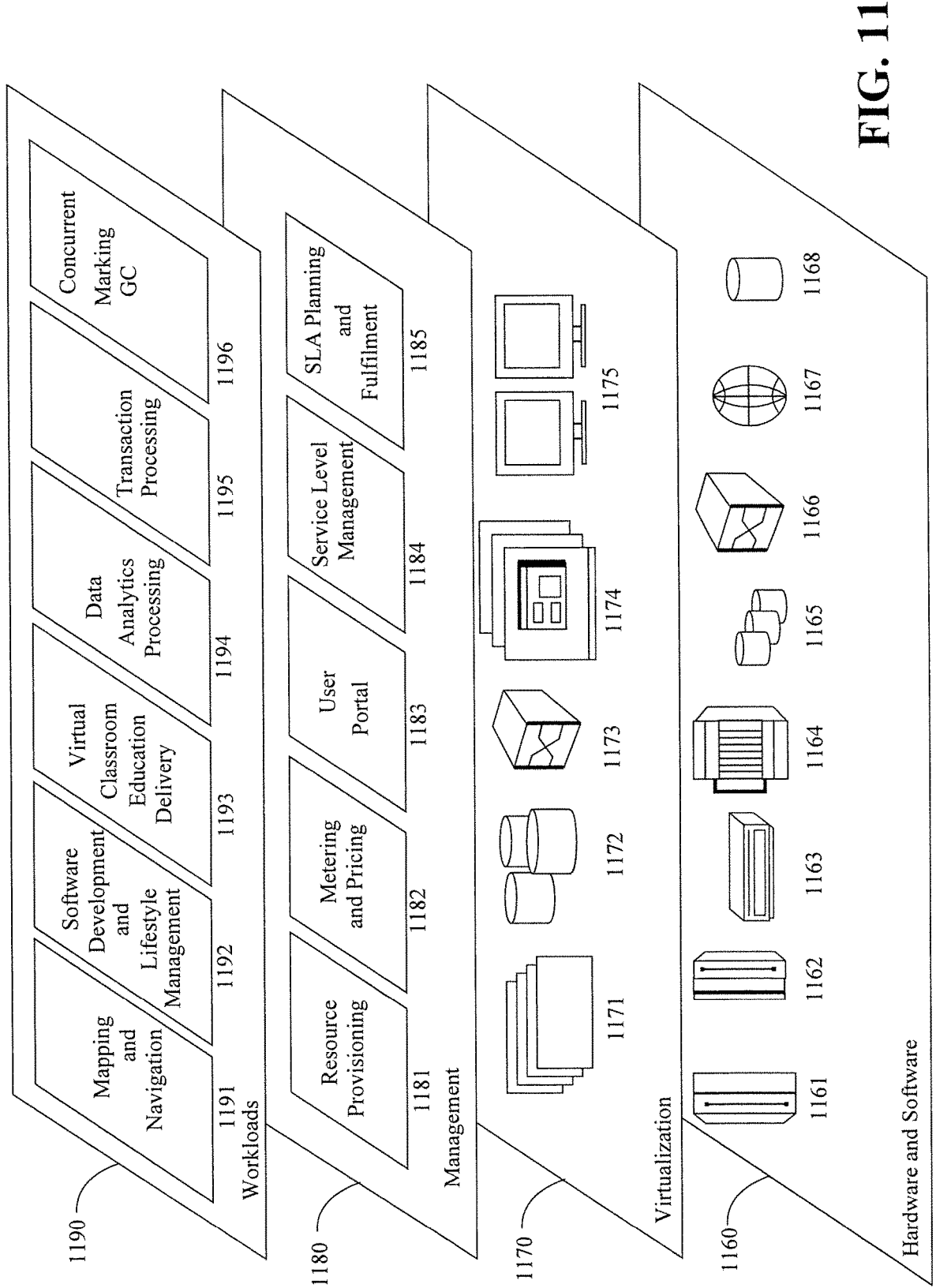
FIG. 11 is a block diagram showing a set of functional abstraction layers provided by a cloud computing environment, in accordance with an embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and concurrent marking GC 1196.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for reducing Compare And Swap (CAS) operations in a concurrent marking Garbage Collection (GC) process that operates on objects corresponding to a bit map of multiple blocks, the method comprising;

finding, from among the objects, live objects that belong to a same block in the bit map from among the multiple blocks when traversing object trees of the objects for GC marking by determining if a parent and a child of the parent correspond to a same word in the bit map; and loading a latest value of the same block from the bitmap, updating the latest value by setting corresponding marking bits in the bit map, comparing set values to previous values in the bitmap, updating the same block in the bit map with a single CAS operation upon a match being detected from the comparison of the set values to the previous values in the bitmap, and swapping out the previous values for the set values upon a mismatch being detected from the comparison of the set values to the previous values in the bitmap, wherein the parent has a link going from the parent to the child.

2. The computer-implemented method of claim 1, wherein said finding step scans the objects in breadth-first order to find the live objects that belong to the same block in the bit map.

3. The computer-implemented method of claim 1, wherein said finding step scans the objects in depth-first order to find the live objects that belong to the same block in the bit map.

4. The computer-implemented method of claim 1, wherein said finding step scans the objects in a combination of breadth-first and depth-first orders to find the live objects that belong to the same block in the bit map.

5. The computer-implemented method of claim 1, wherein said finding step scans the objects in a combination of breadth-first and depth-first orders with adaptive widening of a search space until an object belonging to a different block appears, to find the live objects that belong to the same block in the bit map.

6. The computer-implemented method of claim 1, wherein the live objects have a current reference corresponding thereto.

7. The computer-implemented method of claim 1, wherein setting corresponding marking bits in the bit map comprises setting respective marking bits of the live objects in the same block in a heap.

8. The computer-implemented method of claim 1, wherein setting corresponding bits in the bit map comprises setting multiple bits corresponding to multiple live objects from among the objects.

9. The computer-implemented method of claim 8, wherein the multiple bits that are set correspond to at least one of sibling objects and child objects, from among the live objects, with respect to a current object.

10. The computer-implemented method of claim 1, wherein said updating step concurrently updates marking bits for both the parent and the child indicating the parent and the child are live responsive to the parent and the child corresponding to the same word in the bit map.

11. A computer program product for reducing Compare And Swap (CAS) operations in a concurrent marking Garbage Collection (GC) process that operates on objects corresponding to a bit map of multiple blocks, the computer program product comprising a non-transitory computer readable storage medium having program instructions embodied therewith, the program instructions executable by a computer to cause the computer to perform a method comprising:

finding, from among the objects, live objects that belong to a same block in the bit map from among the multiple blocks when traversing object trees of the objects for GC marking by determining if a parent and a child of the parent correspond to a same word in the bit map; and loading a latest value of the same block from the bitmap, updating the latest value by setting corresponding marking bits in the bit map, comparing set values to previous values, updating the same block in the bit map with a single CAS operation upon a match being detected from the comparison of the set values to the previous values in the bitmap, and swapping out the previous values for the set values upon a mismatch being detected from the comparison of the set values to the previous values in the bitmap, wherein the parent has a link going from the parent to the child.

12. The computer program product of claim 11, wherein said finding step scans the objects in breadth-first order to find the live objects that belong to the same block in the bit map.

13. The computer program product of claim 11, wherein said finding step scans the objects in depth-first order to find the live objects that belong to the same block in the bit map.

14. The computer program product of claim 11, wherein said finding step scans the objects in a combination of breadth-first and depth-first orders to find the live objects that belong to the same block in the bit map.

15. The computer program product of claim 11, wherein said finding step scans the objects in a combination of breadth-first and depth-first orders with adaptive widening of a search space until an object belonging to a different block appears, to find the live objects that belong to the same block in the bit map.

16. The computer program product of claim 11, wherein the live objects have a current reference corresponding thereto.

17. The computer program product of claim 11, wherein setting corresponding marking bits in the bit map comprises setting respective marking bits of the live objects in the same block in a heap.

18. The computer program product of claim 11, wherein setting corresponding bits in the bit map comprises setting multiple bits corresponding to multiple live objects from among the objects.

19. The computer program product of claim 18, wherein the multiple bits that are set correspond to at least one of sibling objects and child objects, from among the live objects, with respect to a current object.

20. A computer processing system for reducing Compare And Swap (CAS) operations in a concurrent marking Garbage Collection (GC) process that operates on objects corresponding to a bit map of multiple blocks, the computer processing system comprising;

a memory device for storing program code; and a hardware processor, operatively coupled to the memory device, for running the program code to find, from among the objects, live objects that belong to a same block in the bit map from among the multiple blocks when traversing object trees of the objects for GC marking by determining if a parent and a child of the parent correspond to a same word in the bit map; and load a latest value of the same block from the bitmap, update the latest value by setting corresponding marking bits in the bit map, compare set values to previous values, update the same block in the bit map with a single CAS operation upon a match being detected from the comparison of the set values to the previous values in the bitmap, and swapping out the previous values for the set values upon a mismatch being detected from the comparison of the set values to the previous values in the bitmap, wherein the parent has a link going from the parent to the child.

* * * * *